Aug. 22, 1967 — M. A. MOSKOVITZ — 3,337,246
BALL JOINT
Filed April 10, 1961
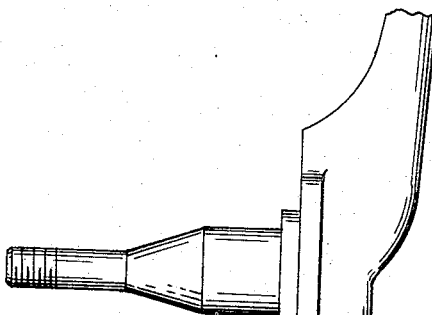
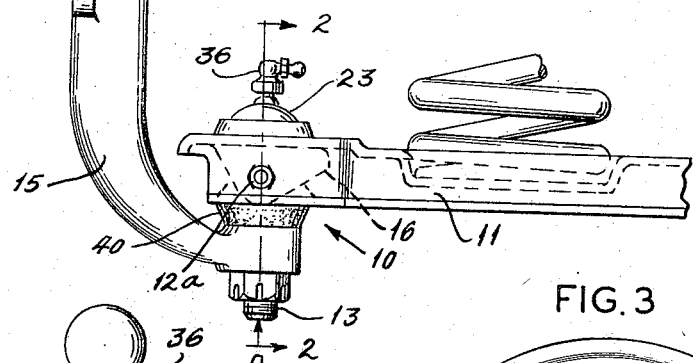
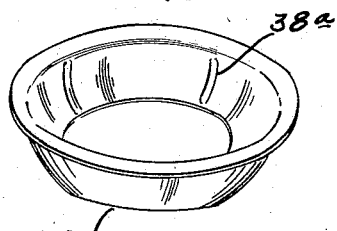
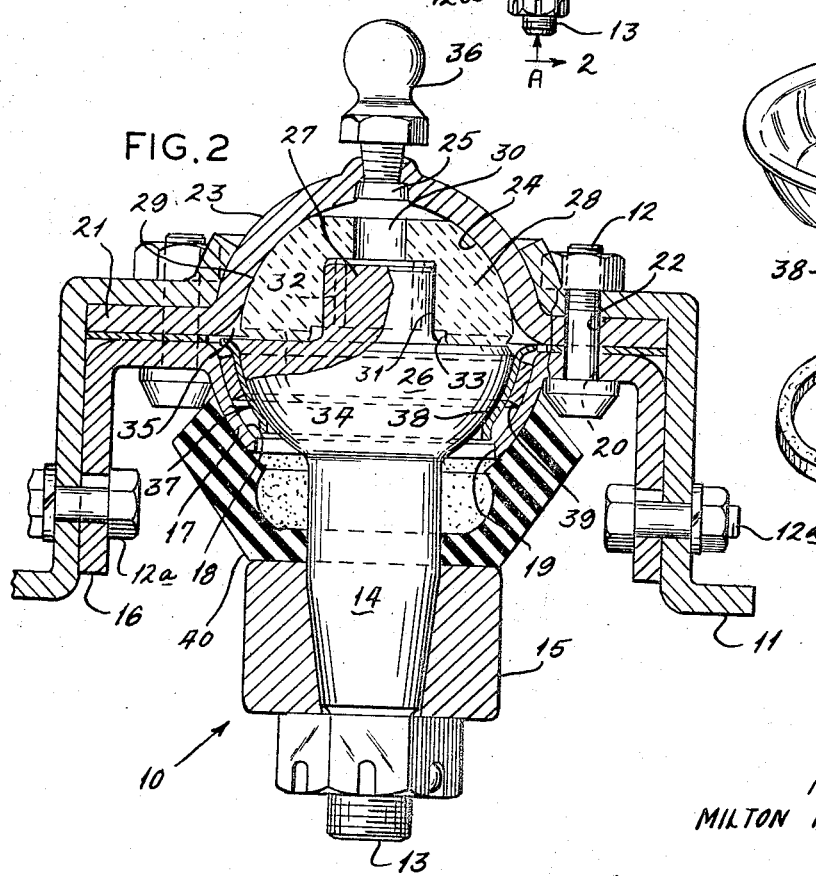
INVENTOR:
MILTON A. MOSKOVITZ
BY Gravely, Lieder & Woodruff
ATTORNEYS.

United States Patent Office 3,337,246
Patented Aug. 22, 1967

3,337,246
BALL JOINT
Milton A. Moskovitz, Richmond Heights, Mo.
(855 Scott St., Murfreesboro, Tenn. 37130)
Filed Apr. 10, 1961, Ser. No. 144,280
(Filed under Rule 47(a) and 35 U.S.C. 116)
2 Claims. (Cl. 287—90)

The present invention relates to improvements in the construction of ball joint devices and particularly relates to compression loaded ball joint constructions.

Present ball joint assemblies are subject to either tension or compression loading, depending on the manufacturing preference of the automobile manufacturer. Present ball joint assemblies also tend to be loose fitting due to manufacturing tolerances, wear, and the like. There are several arrangements available to eliminate the loose fit in tension loaded devices, but these arrangements have not proven successful with compression loaded ball joints. Also, positive adjustment means to take up the looseness have proven to be useful, but of necessity, the positive adjustment devices are expensive. Heretofore, presently known devices have not proven to be simple, relatively inexpensive and effective in maintaining a tight fit in compression loaded ball joints.

One of the principal objects of the present invention is to provide a ball joint in which all of the parts within the housing are maintained in close fitted relation, whereby wheel looseness, chatter and wander is avoided.

Another object of the present invention is to provide a compression loaded ball joint in which bearing surfaces are resiliently maintained in working contact during reversals in the loading which normally occur in service when the vehicle engages a depression or high spot in the road during high speed operation.

Still another object of the present invention is to provide an improved ball joint assembly in which a resilient wear assembly comprising a hard metal wear ring and a resilient means is interposed between the outer surface of a stud head and the inner surface of the lower housing.

Still another object is to provide a compression loaded ball joint assembly in which a wear resistant resilient means urges a bearing surface into contacting engagement with the ball joint housing, said resilient means being interposed in the ball joint assembly so that the normal loading force is additive to the force exerted by the compressed resilient means.

Still another object is to provide a ball joint assembly having a hardened upper housing and a softer metal lower housing which are press fit together through hardened studs which pass through similarly sized openings in each of the housings and in which a hard metal wear ring backed by a rubber resilient means is interposed between the stud head and the downwardly depending lip of the lower housing which retains the stud therein.

The present invention comprises a ball joint assembly in which a resilient backed wear surface urges a bearing surface into engagement with a load bearing surface on the housing with a force additive to the normal loading force and opposed to the reversal of forces which occurs during operation of the vehicle mounting the assembly.

These and other objects and advantages will become apparent hereinafter.

In the drawings, wherein like numerals refer to like figures wherever they occur, FIG. 1 is an elevational view of the present invention installed in a vehicle with the wheel spindle and lower control arm partially broken away, FIG. 2 is a sectional view taken along line 2—2 of FIG. 1, FIG. 3 is a perspective view of the wear ring, and FIG. 4 is a perspective view of the resilient means.

As shown in FIG. 1, the present ball joint 10 is adapted to be fastened to the undersurface of the lower control arm 11 of a vehicle by means of bolts 12 and 12a. A stud 13, which forms part of the ball joint 10, has a lower shank portion 14 which engages a wheel spindle arm 15 to complete the ball joint installation.

In addition to the stud 13, the ball joint 10 includes a lower housing 16 having a reduced outwardly dished segmental spherical portion 17 which forms an inner stud head retaining surface 18 and is provided with an opening 19 to receive the stud shank 14. The lower housing 16 also is provided with spaced openings 20 which receive the bolts 12.

The ball joint 10 also includes an upper housing 21 having openings 22 vertically aligned with the openings 20, and a semi-spherical portion 23 having an inner bearing surface 24 and provided with an opening 25 through the center thereof.

The stud 13 includes a semi-spherical head 26 carrying a projection 27 in the center thereof. A semi-spherical bearing member 28 (preferably formed of powdered metal) fits on the projection 27. The member 28 includes a frusto-spherical outer bearing surface 29 which rides on the upper housing inner bearing surface 24, and is provided with an opening 30 vertically aligned with the upper housing opening 25. The bearing 28 includes a counterbore 31 which receives the stud head projection 27 and has lubrication passages 32 communicating the housing opening 25 with an annular groove 33 adjacent to the stud head projection 27. Outwardly extending lubrication grooves 34 communicate the annular groove 33 with a second annular groove 35 defined between the stud head 36, the bearing member 28 and the upper housing inner surface 24.

A lubrication fitting 36 fastened in the opening 25 allows lubricant to be passed to all of the movable parts of the ball joint 10 through the aforementioned series of passageways.

The lower housing 16 is made of a softer metal than the bolts 12 and the upper housing 21 is made of a metal that is harder than or of the same hardness as the bolts 12. Thus the openings 20 and 22 in the lower housing 16 and in the upper housing 21 respectively can be the same size and the bolts 12 press fitted therein. The bolts 12 will push through the softer metal of the lower housing 16 and will be shaved down by the harder metal of the upper housing 21 and thus lock the housings in assembled relation. In the case of the housing 21 being as hard as the bolts 12, the assembly will be in a push or press fit where both metal parts 12 and 21 are stressed.

A novel wear resistant resiliently backed assembly 37 is interposed between the stud head 26 and the lower housing inner surface 18. The assembly 37 includes a hard metal wear ring 38 which seats against the inner surface of the stud head 26, and a resilient grease resistant member 39 (preferably rubber) which is initially deformed between the wear ring 38 and the lower housing inner surface 18 when the ball joint 10 is assembled. The wear ring 38 has longitudinal lubrication grooves 38a in the inner stud head engaging surface which communicate with the annular lubricant groove 35.

The rubber resilient member 39 is initially subjected to deformation and therefore exerts forces in all directions. Thus the member 39 resists side thrusts and non-axial forces which may result from non-axial loading and forces on the ball joint assembly.

A dust guard or seal boot 40 fits around the lower housing 16 and the stud shank 14 to keep out foreign matter.

When ball joints are mass produced, there is a certain tolerance normally permissible in their manufacture, and this can be reduced only by expensive, time-consuming machining operations. Therefore, there is normally play and looseness between the ball and the housing surfaces which only becomes apparent when the load is reversed, as happens when the vehicle wheel engages a depression or raised spot in the road during high speed operation. Then the normally non-load bearing surface of the ball joint engages the corresponding inner surface of the housing causing chattering or a sharp report, and sometimes causing the wheels to wander or otherwise misbehave.

As mentioned, conventional spring loaded devices satisfactorily compensate for these conditions in tension loaded ball joint, but not in compression loaded equipment. Therefore, the present improvements provide a simple and economical structure whereby the production tolerance buildup between the upper housing 21 and the lower housing 16 can be compensated for by the cup element 38 and deformable element 39. This allows the bolt holes or apertures 22 and 20 respectively to be matched as to spacing and in size by using the same piercing dies so that both sets of holes are formed in the same way.

In the present device, the ball joint 10 is under a compression load along the direction of the arrows A in FIG. 1. Since the resilient means 39, which is positioned beneath the stud head 26 and between the wear ring 38 and the lower housing inner surface 18, is deformed when the ball joint 10 is assembled, it tends to urge the bearing bearing member 28 into engagement with the housing bearing surface 24, and thus is additive to the compressive force normally asserted by the load.

Therefore, when the load is reversed, that is, when the vehicle is lifted from the ball joint and the only weight on the joint is the tension loaded weight of the wheel, the resilient means 39 tends to oppose the reversal of load and is still urging the bearing member 28 into engagement with the upper housing inner bearing surface 24.

There are possible modifications of the assembly 37, but the essential functional characteristics are that a wear resistant surface be presented to the stud head 26 and that a resilient member be interposed between the stud head 26 and the lower housing inner surface 18.

One of the other advantages of the present invention is that the lower housing 16 can be a softer metal than that presently used for such housings, since the wear ring 39 takes the wear resulting from side thrust which often is encountered in ball joint constructions. Therefore, the openings 20 and 22 can be of the same size and the bolts 12 need only be harder than the metal in the lower housing 16 and the same or not as hard as the metal in the upper housing 21, so that when the bolts 12 are press fitted, the upper and lower housings will stay in engagement.

Another advantage of the present invention is that the upper housing 21 and the lower housing 16 can be disassembled, if for any reason, it is desirable or necessary to change any of the parts within the housings 21 and 16. For example, the resilient means 39 may deteriorate upon long standing on a dealer's shelves, or may become worn after use, particularly if the steering apparatus is not exactly balanced and aligned. Under any of the foregoing circumstances, it may become necessary to replace the resilient means 39 or the wear ring 38.

The ball joint assembly 10 is removed from the control arm 11 and the bolts 12 are pushed out of the openings 22 and 20 in the upper housing 21 and the lower housing 16 respectively to disassemble the ball joint 10. When the bolts 12 are reengaged in the openings 20 and 22, the housings 16 and 21 are held in close fitting assembled relation as hereinbefore described. The bolts 12 can be removed and the housings 16 and 21 disassembled and reassembled several times before the openings 20 and 22 become too worn to hold the housings 16 and 21 in the necessary close fitting arrangement.

Thus it is apparent that the present invention provides a ball joint asembly which achieves all the objects and advantages sought therefor.

This invention is intended to cover all changes and modifications of the examples of the invention herein chosen for purposes of the disclosure, which do not constitute departures from the spirit and scope of the invention.

What is claimed is:

1. In a compression loaded ball joint assembly the combination of: a housing providing therewithin a principal load bearing surface of partly spherical form adjacent one end, a stud having a head in said housing with a first bearing surface thereon engaged on said principal bearing surface for movement relative thereto, said stud head having a second bearing surface opposed to said first bearing surface and a shank projecting from said second bearing surface, said housing including a wall structure with an internal surface enclosing said second bearing surface and spaced therefrom to provide an annular cavity opening outwardly at an aperture in said wall structure opposite said one end of said housing and through which said stud shank projects, a bearing cup mounted in said annular cavity in bearing engagement upon said second bearing surface of said stud head and having a first terminal edge adjacent one end remote from said shank and extending angularly outwardly a sufficient distance relative to said second bearing surface and within said annular cavity to engage said internal surface of said wall structure upon movement of said stud head, and a second terminal edge extending downwardly relative to said stud member and disposed closely adjacent said internal surface, said cup terminal edges and internal surface defining a given volume and an elastomeric ring element in said annular cavity formed with an inner surface engaging said bearing cup, an outer surface bearing on said internal surface of said wall structure inwardly of said aperture, said ring element being initially compressed for yieldingly loading said bearing cup into bearing engagement with said second bearing surface of said stud head and normally exerting a preload on said stud head to retain said first bearing surface on said stud head and said principal load bearing surface of said housing in engagement, said ring element having a volume so proportioned to said given volume that upon extreme condition of compression of said ring element, such as a lateral stress, substantially greater than normal and consequent cold flow thereof, no portion of said ring will extrude beyond or flow into a position that it would suffer destruction by either of said terminal edges, such that said ring element is free to further compress and alter its cross-sectional shape within said annular cavity between said bearing cup and internal surface of said wall structure upon movement of said bearing cup and stud head in a direction to displace either of said terminal edges toward said wall structure, whereby the latter movement of said terminal edges confines said resilient ring element within said annular cavity.

2. The ball joint assembly set forth in claim 1, wherein said housing is divided into separable portions each having flange means providing surfaces of abutment and apertures in aligned relationship, one of said housing portions having said principal load bearing surface therewithin and being formed of hardened metal and the other of said housing portions including said wall structure providing said annular cavity with said outwardly opening aperture and being formed of relatively less hard metal than said one housing portion, and securing bolt means having harder surfaces than said other of said housing portions and of substantially the same hardness as said one housing portion, said bolt means having shanks the diameters of which are substantially similar in size to said aligned apertures in said abutting flanges and being press fitted therethrough to retain said housing portions in assembly against the initial compression of said resilient ring element.

References Cited

UNITED STATES PATENTS

| | | | |
|---|---|---|---|
| 2,274,420 | 2/1942 | Katcher | 287—90 |
| 2,425,138 | 8/1947 | Venditty | 287—90 X |
| 2,917,334 | 12/1959 | Baker | 287—90 X |
| 2,934,365 | 4/1960 | Moskovitz | 287—90 |
| 2,974,975 | 3/1961 | Thomas | 287—90 X |
| 2,998,262 | 8/1961 | Hoffman | 287—90 X |
| 3,005,647 | 10/1961 | Collier | 287—90 |
| 3,026,124 | 3/1962 | Eyb | 287—90 X |

FOREIGN PATENTS

| | | |
|---|---|---|
| 813,044 | 5/1959 | Great Britain. |
| 296,757 | 5/1954 | Switzerland. |

CARL W. TOMLIN, *Primary Examiner.*

A. V. KUNDRAT, *Assistant Examiner.*